United States Patent [19]

Kim

[11] Patent Number: 5,426,553
[45] Date of Patent: Jun. 20, 1995

[54] APPARATUS FOR MONITORING GROUNDED STATES OF MULTIPLE DC LOADS OF RELAY SYSTEM

[76] Inventor: Sang C. Kim, Industry Currency Business Center 22-327 Siheung 3-dong 984, Kuro-Ku, Seoul, Rep. of Korea

[21] Appl. No.: 108,811

[22] Filed: Aug. 19, 1993

[51] Int. Cl.⁶ .............................................. H02H 3/16
[52] U.S. Cl. ...................... 361/44; 361/46; 361/47
[58] Field of Search ................ 361/42, 43, 44, 45, 361/46, 47, 48, 49, 50, 91

[56] References Cited

U.S. PATENT DOCUMENTS

| | | | |
|---|---|---|---|
| 3,783,340 | 1/1974 | Becker | 361/42 |
| 4,159,499 | 6/1979 | Beveakin | 361/42 |
| 4,280,162 | 7/1981 | Tanka et al. | 361/45 |
| 4,912,588 | 3/1990 | Thomi et al. | 361/455 |

OTHER PUBLICATIONS

"DC Ground Relay Specification", Sun Kwang Electric Co., Ltd., Korea along with an English-language translation.

*Primary Examiner*—Todd DeBoer
*Attorney, Agent, or Firm*—Spencer, Frank & Schneider

[57] ABSTRACT

An apparatus for monitoring grounded states of multiple DC loads of a relay system, comprising a power supply circuit for inputting a commercial AC power and supplying DC voltages necessary to the DC loads and (+) and (−) DC circuit lines to which the DC loads connected, a low frequency signal generating circuit for transmitting a low frequency AC signal over the (+) and (−) DC circuit lines, the low frequency AC signal having the range of having no effect on different components, main (−) and (+) grounded state detecting circuits for detecting (−) and (+) grounded states of the whole of the (+) and (−) DC circuit lines and the DC loads, respectively, an overvoltage detecting circuit for detecting an overvoltage at an input stage of the apparatus to protect the apparatus from the overvoltage, a grounding current detecting circuit for detecting individually the low frequency AC signals from the DC loads when the DC loads are grounded, and a load fault signal generating circuit for generating load fault signals in response to grounding current signals from the grounding current detecting circuit. Therefore, a faulty state of the whole or each of the DC loads can readily be monitored through each lamp by detecting the low frequency AC signals leaked from the multiple DC loads due to the grounding.

11 Claims, 6 Drawing Sheets

APPARATUS FOR MONITORING GROUNDED STATES OF MULTIPLE DC LOADS OF RELAY SYSTEM

BACKGROUND OF THE INVENTION

1. Field of the Invention

The present invention relates in general to relay systems, and more particularly to an apparatus for monitoring grounded states of multiple direct current (DC) loads of a relay system, which is disposed in a DC power board.

2. Description of the Prior Art

Conventional apparatus for monitoring grounded states of multiple DC loads of a relay system, each of which is disposed in a DC power board, are merely operated in the case where a leakage current of each DC load flows exceeding a rating. However, some of the leakage currents of the multiple DC loads may be within the range of the rating, others may be beyond the range of the rating. For this reason, it is impossible to set the optimum leakage current suitably to a system characteristic. This results in an unnecessary interruption of power to the multiple DC loads. Also, a grounding current cannot be classified in polarity. One example of this form of apparatus for monitoring the grounded states of the multiple DC loads of the relay system is shown in product specifications (Model DGLR-30) available from SUN KWANG ELECTRIC Co., Ltd., Korea.

SUMMARY OF THE INVENTION

Therefore, the present invention has been made in view of the above problems, and it is an object of the present invention to provide an apparatus for monitoring grounded states of multiple DC loads of a relay system, in which an alternating current (AC) signal of low frequency of the range of having no effect on different components is applied to DC circuit lines to which the multiple DC loads are connected, and the grounded state of the whole or each of the DC loads can readily be monitored by detecting the low frequency AC signal components leaked from the multiple DC loads due to the grounding.

In accordance with the present invention, the above and other objects can be accomplished by a provision of an apparatus for monitoring grounded states of multiple DC loads of a relay system, comprising: power supply means for inputting a commercial AC power and supplying DC voltages necessary to the DC loads and (+) and (−) DC circuit lines to which the DC loads connected; low frequency signal generating means for receiving a desired AC voltage from said power supply means and transmitting a low frequency AC signal over said (+) and (−) DC circuit lines, the low frequency AC signal having the range of having no effect on different components; main (−) grounded state detecting means for receiving a desired AC voltage from said power supply means and detecting a (−) grounded state of the whole of the (+) and (−) DC circuit lines and the DC loads; main (+) grounded state detecting means for receiving a desired AC voltage from said power supply means and detecting a (+) grounded state of the whole of the (+) and (−) DC circuit lines and the DC loads; overvoltage detecting means for receiving a desired AC voltage from said power supply means and detecting an overvoltage at an input stage of the apparatus to protect the apparatus from the overvoltage; grounding current detecting means for detecting individually the low frequency AC signals transmitted by said low frequency signal generating means from the DC loads when the DC loads are grounded and converting the detected low frequency AC signals into digital grounding current signals; and load fault signal generating means for generating load fault signals in response to the grounding current signals from said grounding current detecting means so as to indicate individually the grounded states of the DC loads.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

First, the whole function of an apparatus for monitoring grounded states of multiple DC loads of a relay system in accordance with the present invention will be described with reference to FIG. 1 in which a front panel of the apparatus is shown.

Figure 1:
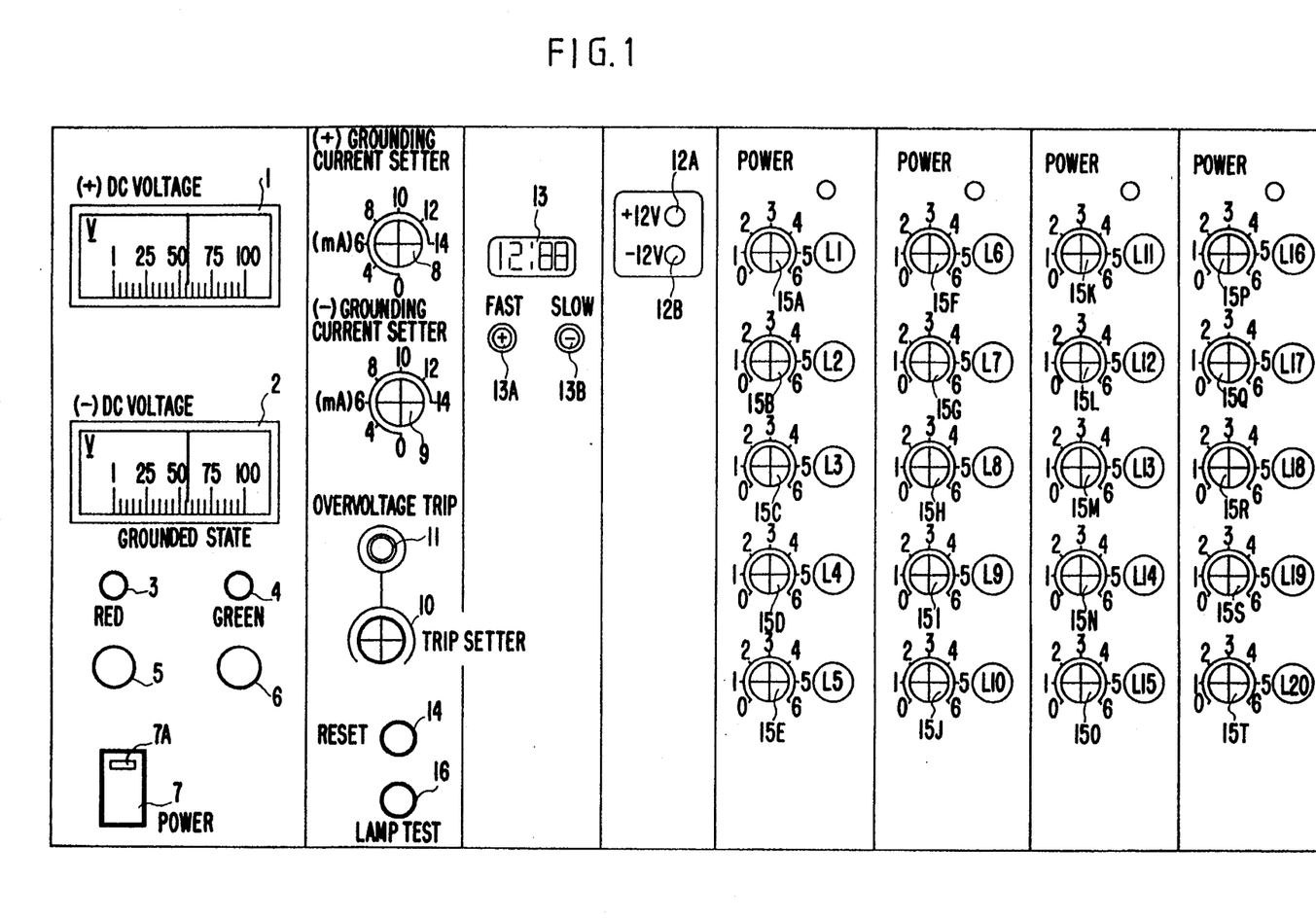
FIG. 1 is a view illustrating a front panel of an apparatus for monitoring grounded states of multiple DC loads of a relay system in accordance with the present invention.

In FIG. 1, (+) and (−) DC voltmeters 1 and 2 are disposed on the front panel to indicate an input DC voltage positively and negatively by half, respectively. As a result, summing the voltages indicated by the (+) and (−) DC voltmeters 1 and 2 is the same as the input DC voltage.

In the normal state, the voltages indicated by the (+) and (−) DC voltmeters 1 and 2 are substantially the same. In the grounded state, one of the voltages indicated by the (+) and (−) DC voltmeters 1 and 2 is extremely higher or lower than the other. In this case, the lower voltage is a grounding voltage, as well-known. For example, in the case where the input voltage is 110 V, 75 V of the input voltage is indicated by the (+) DC voltmeter 1 and the remaining 35 V is indicated by the (−) DC voltmeter 2, it can readily be seen that the (−) polarity is grounded. It should be noted that a voltage deviation may be present within the range of 3 V according to circumstances of the spot. This indicates that DC circuit lines are not grounded.

When the DC circuit lines are grounded positively, a main grounded state indicating red lamp 3 is lighted. On the contrary, when the DC circuit lines are grounded negatively, a main grounded state indicating green lamp 4 is lighted. Therefore, the grounded state of the DC circuit lines can easily be monitored since it is indicated by polarities by the lamps 3 and 4. At the grounded state of the DC circuit lines, a fault signal may be sent through an external contact to station service and other monitoring circuits at the same time as the lighting.

Grounded state test buttons 5 and 6 are provided on the front panel to test presence of an abnormal state of the apparatus for monitoring the grounded states of the multiple DC loads of the relay system in accordance with the present invention. The grounded state test buttons 5 and 6 are adapted to test the apparatus state by voluntarily allowing a desired grounding current to flow through the loads to the ground. The desired grounding current is in the order of 20-30 mA. In the grounded state test, an alarm is generated by an alarm control circuit since the grounding current is sent to the ground.

A power switch 7 is provided on the front panel to apply a commercial AC power to the apparatus. The power switch 7 contains a light emitting diode 7A therein.

Main (+) and (−) grounding current setters 8 and 9 are provided on the front panel to set the range of a sensitivity of the grounding current with respect to the whole of the DC circuit lines. The setting range is 4-14 mA. For example, in the case where any one of load grounded state detecting lamps L1-L20 is lighted corresponding to a certain DC load line, one of the main grounded State indicating lamps 3 and 4 is lighted by adjusting one of the main (+) and (−) grounding current setters 8 and 9. In other words, one of the main grounded state indicating lamps 3 and 4 is lighted as one of the main (+) and (−) grounding current setters 8 and 9 is rotated to the left or right for the position setting. In this case, the grounding current of a position set just at the moment that one of the main grounded state indicating lamps 3 and 4 is lighted is that detected from the corresponding load. Namely, the main grounded state indicating lamps 3 and 4 are lighted when the sum of leakage currents from the grounded loads exceeds the current values set by the main (+) and (−) grounding current setters 8 and 9. Preferably, the current values set by the main (+) and (−) grounding current setters 8 and 9 are 6-10 mA.

On the other hand, when the DC input voltage exceeds about 10% over a rating, the commercial AC power is interrupted all at once for protection of the apparatus. In this case, an overvoltage indicating lamp 11 is turned on upon application of an overvoltage set by an overvoltage setter 10. The relay system is restored to the original state when the power switch 7 is turned off and again on by the user.

Also, DC voltage supply indicating lamps 12A and 12B are provided on the front panel to indicate DC voltages (±12 V) being supplied to the DC circuit lines. The DC voltage supply indicating lamps 12A and 12B are not lighted in the abnormal state.

A digital watch 13 has a separate function in addition to a general watch function. When the grounded state is detected from the DC circuit lines while the digital watch 13 indicates the current time in the normal state, a grounded state detect signal is applied to the digital watch 13, thereby causing the digital watch 13 to indicate continuously the time stopped just at that moment. The digital watch 13 indicates the current time again when a reset button 14 is pushed by the user after the lapse of time. The stopped time is the time that a fault is generated.

A plurality of DC load grounding current sensitivity setters 15A-15U are also provided on the front panel to set fine grounding currents generated from the loads due to the grounding. The detectable range is in the order of 3-20 mA. A graduation 1 on each setter designates the detectable range of 4 mA. Proceeding to graduations 2, 3, 4, and 5, the detectable range is increased. The approximate detectable range by graduations is as follows:

Graduation 1=3.5-4.5 mA
Graduation 2=4.0-6.0 mA
Graduation 3=5.0-5.5 mA
Graduation 4=8.0-12.0 mA
Graduation 5=11.0-20.0 mA Any one of the plurality of load grounded state detecting lamps L1-L20 is lighted when the grounding current from a corresponding one of the plurality of DC load lines is detected within the set range. At this time, in the case where the main grounded state indicating lamp 3 or 4 is not lighted, the grounding current value of a faulty one of the loads can be recognized by adjusting the main (+) or (−) grounding current setter 8 or 9 positively or negatively. Provided that the main grounded state indicating lamp 3 or 4 is not lighted even when the main (+) or (−) grounding current setter 8 or 9 is rotated to the left or right, the present state can be regarded as an instantaneous grounded state with no great abnormality.

Delay circuits with delay time of about 1 sec are present in ground contacts of the DC circuit lines to avoid a faulty operation of each load due to the instantaneous grounding, as will be described later in detail with reference to FIG. 3.

The reset button 14 is a switch for releasing the apparatus after detection of the faulty operation of the relay system. Upon operation of the reset button 14, the load grounded state detecting lamps L1-L20, the main grounded state indicating lamps 3 and 4 and the digital watch 13 are restored to the original state. However, in the case where the DC circuit lines are broken due to application of the overvoltage to the apparatus, the apparatus is not restored to the original state even upon operation of the reset button 14. In this case, as mentioned above, the apparatus is restored to the original state only when the power switch 7 is turned off and again on by the user.

A lamp test button 16 is also provided on the front panel to test the operations of the load grounded state detecting lamps L1-L20. If the lamp test button 16 is pushed by the user, the load grounded state detecting lamps L1-L20 are simultaneously operated. Provided that any one of the load grounded state detecting lamps L1-L20 is not operated under the condition that the lamp test button 16 is pushed, the user must replace the corresponding lamp with a new one.

In FIG. 1, the reference numeral 13A, not described, designates a button for adjusting an hour unit of the digital watch 13 and the reference numeral 13B, not described, designates a button for adjusting a minute unit of the digital watch 13.

Figure 2:
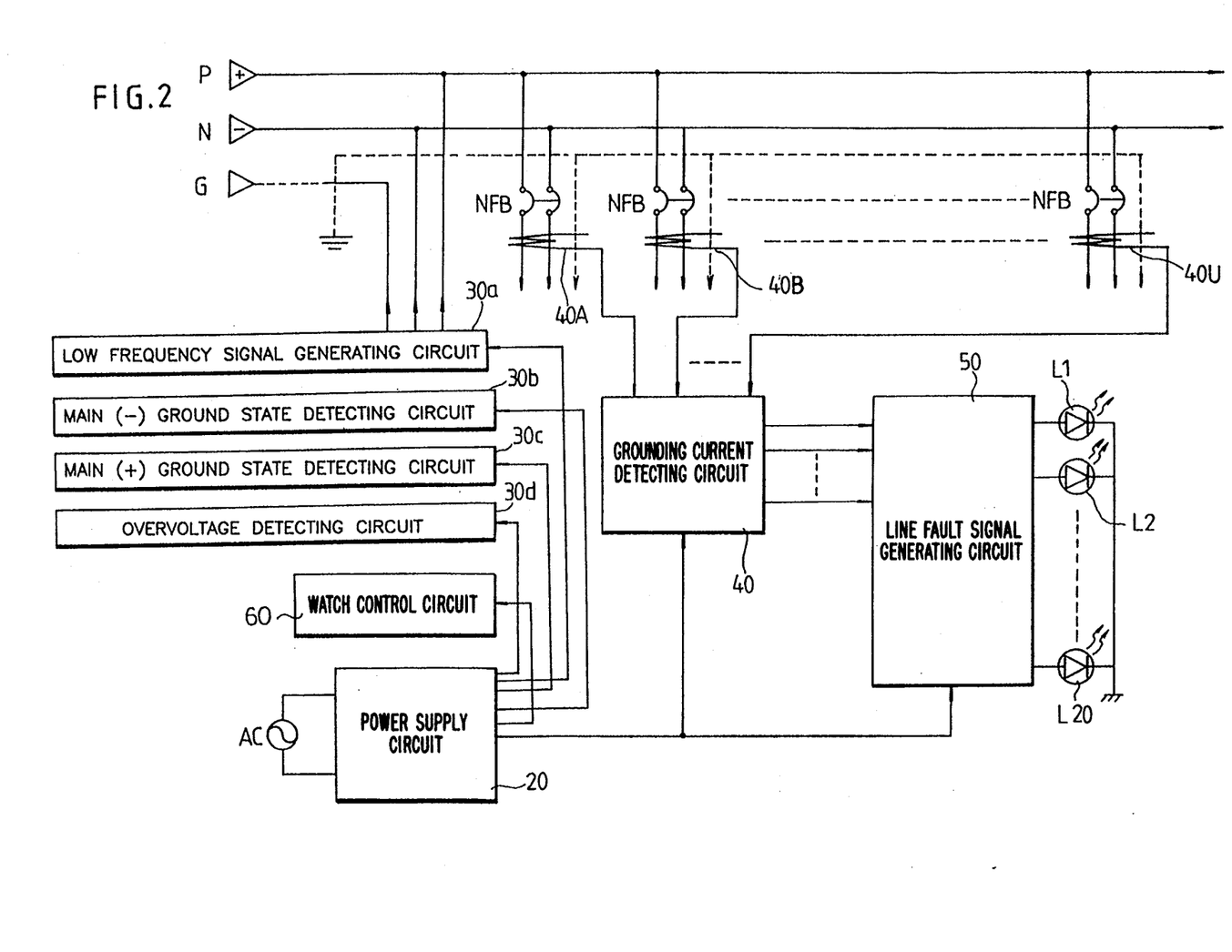
FIG. 2 is a block diagram of the apparatus for monitoring the grounded states of the multiple DC loads of the relay system, which is shown in FIG. 1, in accordance with the present invention.

Referring to FIG. 2, there is shown a block diagram of the apparatus for monitoring the grounded states of the multiple DC loads of the relay system, which is shown in FIG. 1, in accordance with the present invention. As shown in this drawing, the monitoring apparatus of the present invention comprises a power supply circuit 20 for inputting the commercial AC power and supplying DC voltages necessary to the DC circuit lines P and N and the DC load lines.

A low frequency signal generating circuit 30a is provided in the monitoring apparatus to receive a desired AC voltage from the power supply circuit 20 and transmit a low frequency AC signal over the DC circuit lines P and N, the low frequency AC signal having the range (for example, 110–130 Hz) of having no effect on different components.

A main (−) grounded state detecting circuit 30b is also provided in the monitoring apparatus to receive a desired AC voltage from the power supply circuit 20 and detect a (−) grounded state of the whole of the DC circuit lines and the DC loads.

A main (+) grounded state detecting circuit 30c is also provided in the monitoring apparatus to receive a desired AC voltage from the power supply circuit 20 and detect a (+) grounded state of the whole of the DC circuit lines and the DC loads.

When the grounding of each DC load is generated, the main (−) and (+) grounded state detecting circuits 30b and 30c operate the main grounded state indicating lamps 3 and 4 in FIG. 1, respectively.

An overvoltage detecting circuit 30d is also provided in the monitoring apparatus to receive a desired AC voltage from the power supply circuit 20 and detect an overvoltage at an input stage of the apparatus to protect the apparatus from the overvoltage. Upon detecting the overvoltage, the overvoltage detecting circuit 30d interrupts the AC power supply to the power supply circuit 20 and operates the overvoltage trip lamp 11.

A grounding current detecting circuit 40 is also provided in the monitoring apparatus to detect individually the low frequency AC signals transmitted by the low frequency signal generating circuit 30a from the DC loads connected to the DC circuit lines when the DC loads are grounded and convert the detected low frequency AC signals into digital grounding current signals.

A load fault signal generating circuit 50 is also provided in the monitoring apparatus to generate load fault signals in response to the grounding current signals from the grounding current detecting circuit 40 so as to indicate individually the grounded states of the DC loads. The load fault signal generating circuit 50 turns on at least one of the load grounded state detecting lamps L1–L20 corresponding to at least one faulty load, so as to indicate the faulty state of the load.

Figure 4:
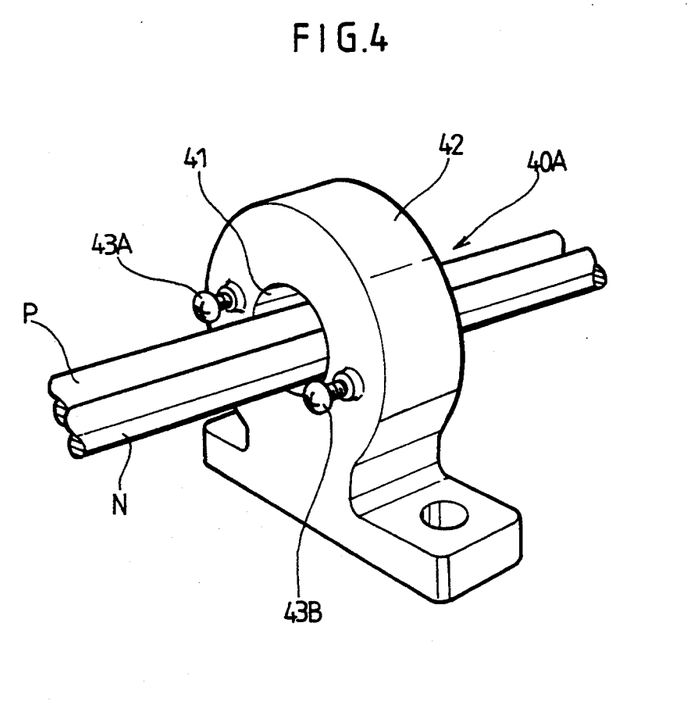
FIG. 4 is a schematic perspective view of a leakage current detecting current transformer of the pulse type in accordance with the present invention.

The grounding current detecting circuit 40 includes a plurality of leakage current detecting current transformers 40A–40U of the pulse type connected respectively to the DC loads to detect individually the low frequency AC signals transmitted by the low frequency signal generating circuit 30a from the DC loads, as will be described later in detail with reference to FIG. 5. As shown in FIG. 4, each of the leakage current detecting current transformers 40A–40U includes a hollow, cylindrical nickel core with a cylindrical body 42 and a hollow hole 41 formed therethrough. The two DC circuit lines P and N are passed through the hollow hole 41. Screws 43A and 43B are inserted into the cylindrical body 42 to detect the low frequency AC signal leaked from the DC circuit lines P and N due to the grounding.

In FIG. 2, the reference numeral NFB, not described, designates a circuit breaker and the reference numeral 60, not described, designates a watch control circuit for controlling the digital watch 13.

Figure 3A:
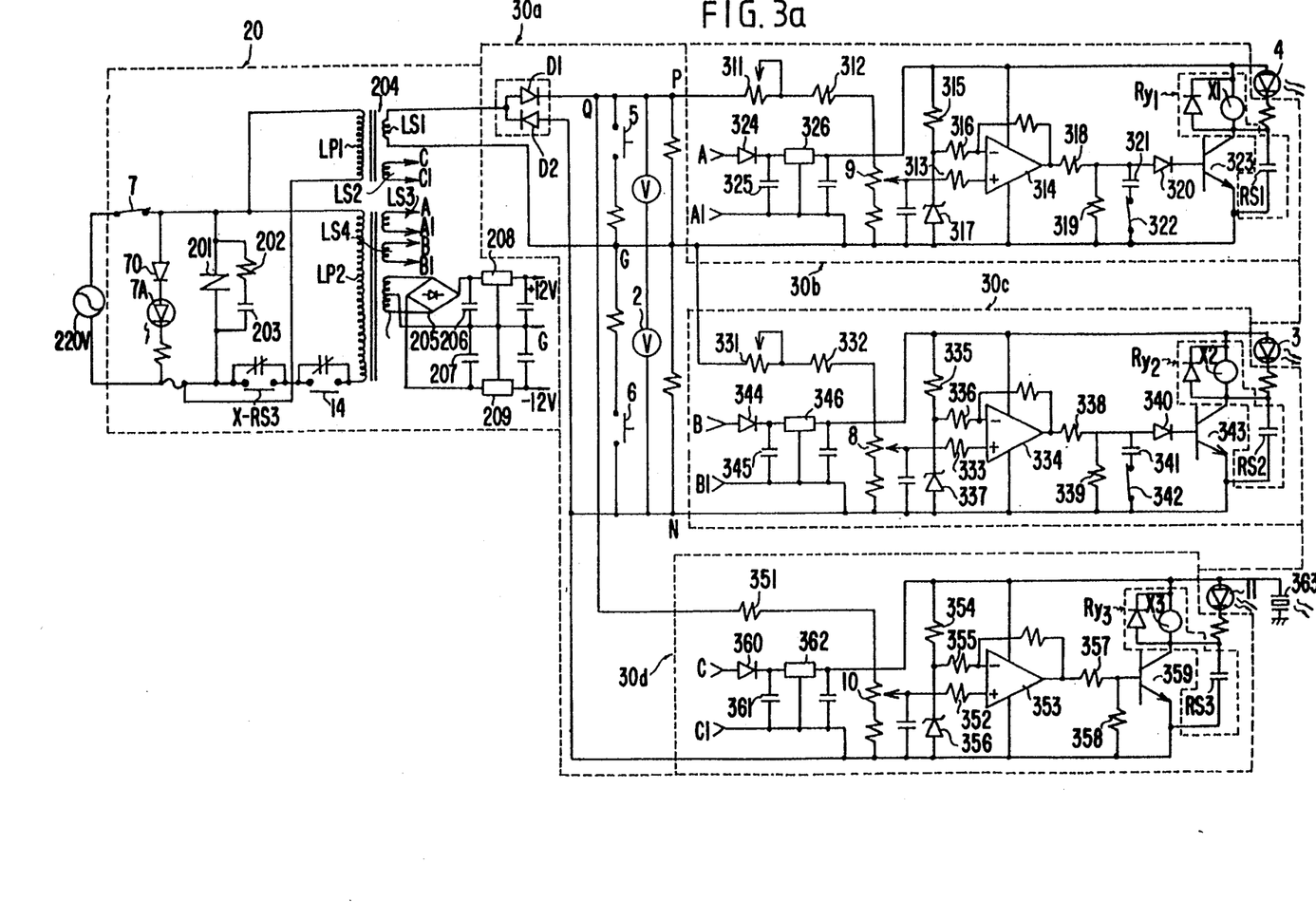
FIG. 3a is a detailed circuit diagram of a power supply circuit, a low frequency signal generating circuit, a main (−) grounded state detecting circuit, a main (+) grounded state detecting circuit and an overvoltage detecting circuit in the apparatus in FIG. 2 in accordance with an embodiment of the present invention.

Referring to FIG. 3a, there is shown a detailed circuit diagram of the power supply circuit 20, the low frequency signal generating circuit 30a, the main (−) grounded state detecting circuit 30b, the main (+) grounded state detecting circuit 30c and the overvoltage detecting circuit 30d in the apparatus in FIG. 2 in accordance with an embodiment of the present invention. As shown in this figure, the low frequency signal generating circuit 30a includes a pair of diodes D1 and D2 for cooperating to convert the AC voltage from the power supply circuit 20 into the low frequency AC signal of 110 Hz–130 Hz and apply the low frequency AC signal to the DC circuit lines P and N and the DC loads, the AC voltage being generated from a first secondary coil LS1 of a power transformer 204 in the power supply circuit 20.

The main (−) grounded state detecting circuit 30b includes a diode 324, a condenser 325 and a constant voltage IC 326 for cooperating to convert the AC voltage A-A1 from the power supply circuit 20 into a DC voltage, the AC voltage A-A1 being generated from a third secondary coil LS3 of the power transformer 204 in the power supply circuit 20.

The main (−) grounded state detecting circuit 30b also includes a variable resistor 311 for setting a current sensitivity according to an increased voltage on the DC circuit line P, a comparison amplifier 314 for comparing an output voltage from the variable resistor 311 with a reference voltage, a delay circuit having a condenser 321 and a switch 322 to delay an output signal from the comparison amplifier 314, a transistor 323 being turned on in response to an output signal from the delay circuit, and a relay RY1 for performing a latching operation for the DC voltage from the constant voltage IC 326 to operate the main (−) grounded state indicating lamp 4 when the transistor 323 is turned on.

The main (+) grounded state detecting circuit 30c includes a diode 344, a condenser 345 and a constant voltage IC 346 for cooperating to convert the AC voltage B-B1 from the power supply circuit 20 into a DC voltage, the AC voltage B-B1 being generated from a fourth secondary coil LS4 of the power transformer 204 in the power supply circuit 20.

Also, the main (+) grounded state detecting circuit 30c includes a variable resistor 331 for setting a current sensitivity according to an increased voltage on the DC circuit line N, a comparison amplifier 334 for comparing an output voltage from the variable resistor 331 with a reference voltage, a delay circuit having a condenser 341 and a switch 342 to delay an output signal from the comparison amplifier 334, a transistor 343 being turned on in response to an output signal from the delay circuit, and a relay RY2 for performing a latching operation for the DC voltage from the constant voltage IC 346 to operate the main (+) grounded state indicating lamp 3 when the transistor 343 is turned on.

The overvoltage detecting circuit 30d includes a diode 360, a condenser 361 and a constant voltage IC 362 for cooperating to convert the AC voltage C-C1 from the power supply circuit 20 into a DC voltage, the AC voltage C-C1 being generated from a second secondary coil LS2 of the power transformer 204 in the power supply circuit 20.

The overvoltage detecting circuit 30d also includes a variable resistor or the overvoltage setter 10 for setting a trip voltage or the overvoltage to protect the apparatus from the overvoltage resulting from the increased voltages on the DC circuit lines P and N, a comparison amplifier 353 for comparing an output voltage from the variable resistor 10 with a reference voltage, a transistor 359 being turned on in response to an output signal from the comparison amplifier 353, and a relay RY3 for performing a latching operation for the DC voltage from the constant voltage IC 362 to operate the overvoltage trip or indicating lamp 11 when the transistor 359 is turned on.

Figure 3B:
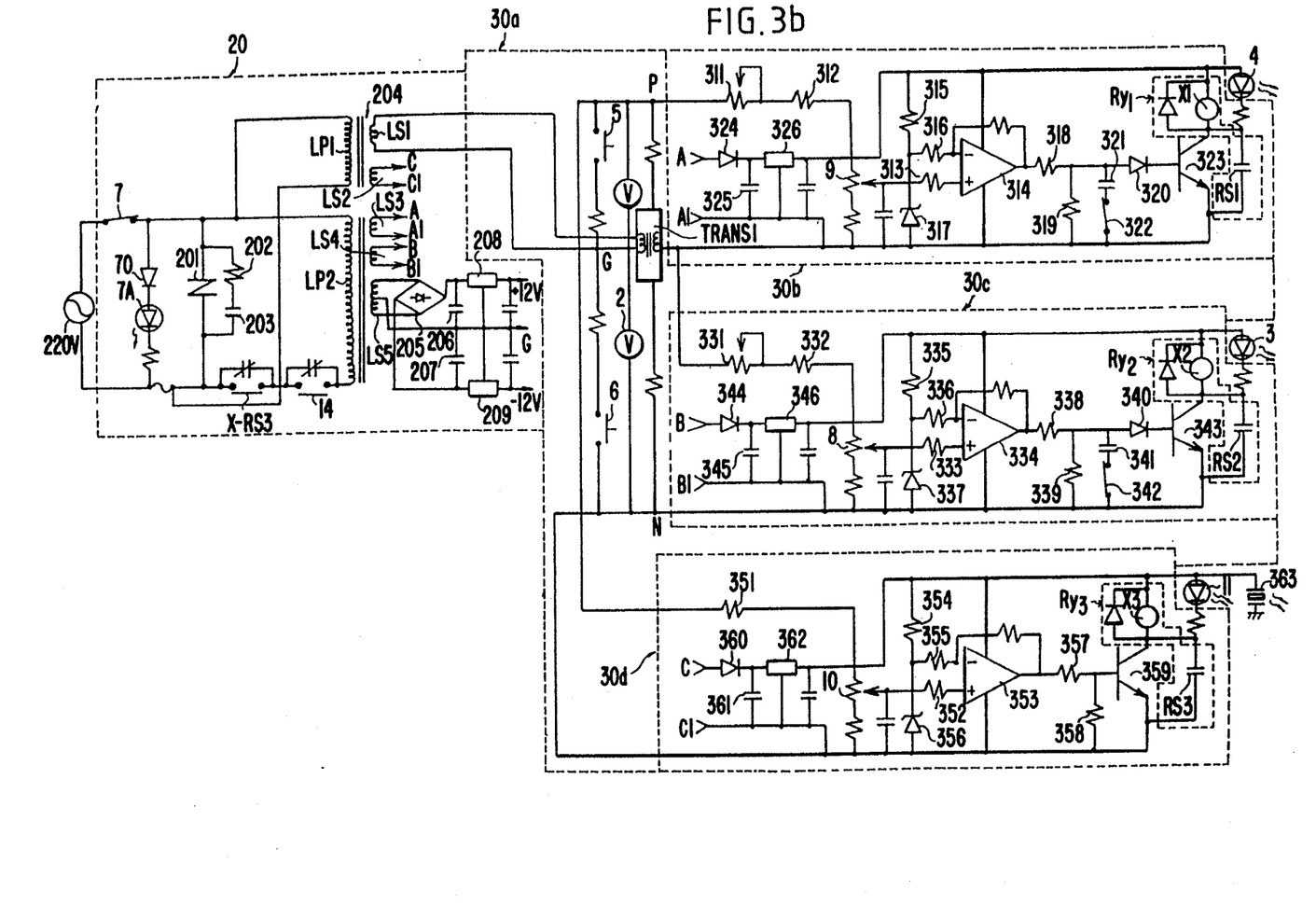
FIG. 3b is a detailed circuit diagram of the power supply circuit, the low frequency signal generating circuit, the main (−) grounded state detecting circuit, the main (+) grounded state detecting circuit and the overvoltage detecting circuit in the apparatus in FIG. 2 in accordance with an alternative embodiment of the present invention.

Referring to FIG. 3b, there is shown a detailed circuit diagram of the power supply circuit 20, the low frequency signal generating circuit 30a, the main (−) grounded state detecting circuit 30b, the main (+) grounded state detecting circuit 30c and the overvoltage detecting circuit 30d in the apparatus in FIG. 2 in accordance with an alternative embodiment of the present invention. The constructions in FIG. 3b are substantially the same as those in FIG. 3a, with the exception that the construction of the low frequency generating circuit 30a is different from that in FIG. 3a.

In FIG. 3b, the low frequency generating circuit 30a includes a transformer TRANS1 instead of the diodes D1 and D2 in FIG. 3a. The transformer TRANS1 applies the low frequency AC signal of full wave resulting from a characteristic thereof to the DC circuit lines P and N, whereas the diodes D1 and D2 applies the low frequency AC signal of half wave to the DC circuit lines P and N. As a result, in the case where the DC circuit lines P and N are grounded, an amount of the low frequency AC signal detected based on the construction in FIG. 3b is about four times as large as that in FIG. 3a. This makes it possible to detect the grounded states more accurately.

Figure 5:
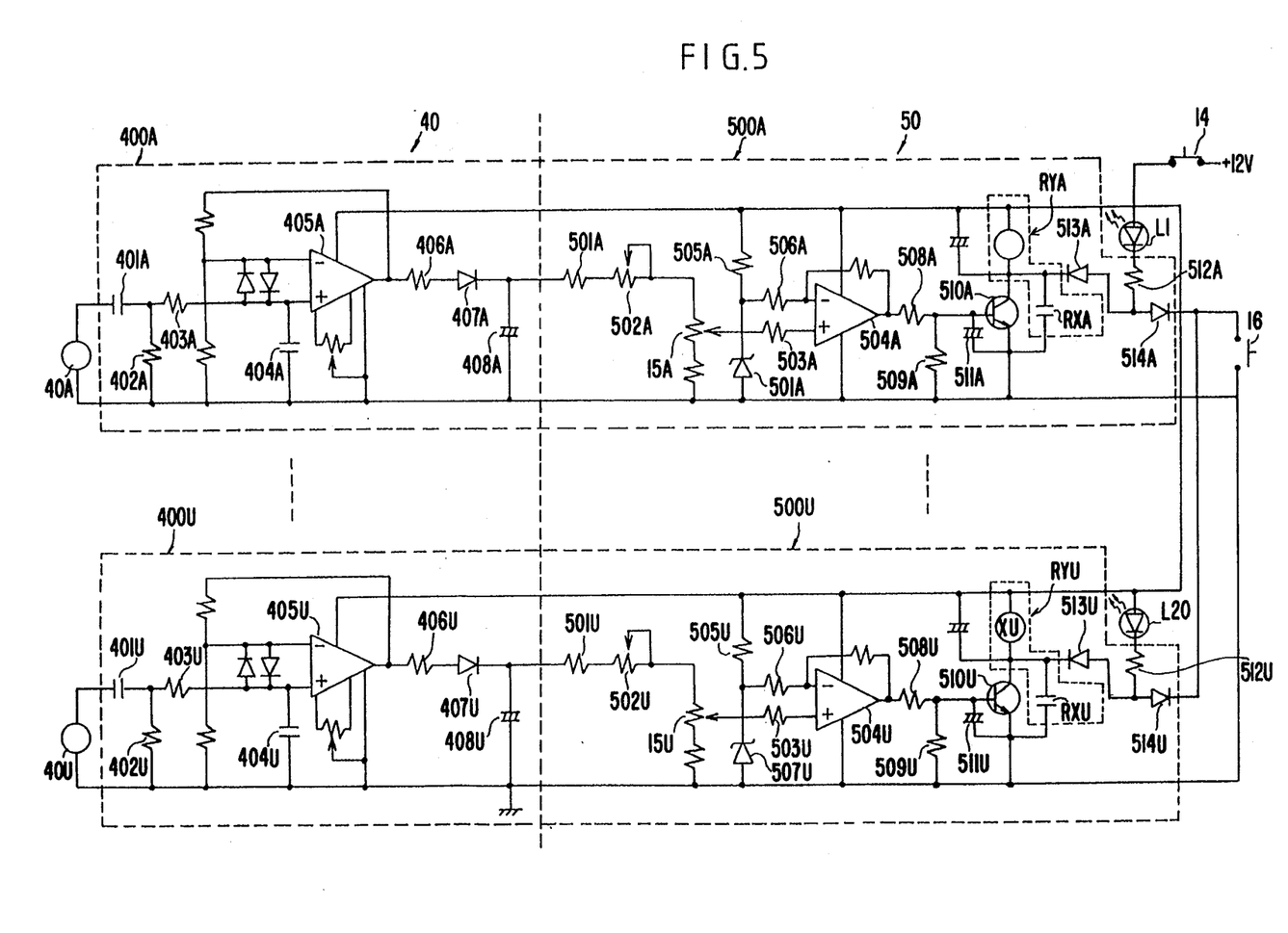
FIG. 5 is a detailed circuit diagram of a grounding current detecting circuit and a load fault signal generating circuit in the apparatus in FIG. 2 in accordance with the present invention.

Referring to FIG. 5, there is shown a detailed circuit diagram of the grounding current detecting circuit 40 and the load fault signal generating circuit 50 in the apparatus in FIG. 2 in accordance with the present invention. As shown in this drawing, the grounding current detecting circuit 40 includes the plurality of leakage current detecting current transformers 40A-40U of the pulse type connected respectively to the DC loads for detecting individually the low frequency AC signals transmitted by the low frequency signal generating circuit 30a from the DC loads, and a plurality of comparison amplifiers 405A-405U for converting the detected low frequency AC signals from the leakage current detecting current transformers 40A-40U into the digital grounding current signals, respectively.

The load fault signal generating circuit 50 includes a plurality of variable resistors 502A-502U for setting voltage levels of the grounding current signals from the grounding current detecting circuit 40 by predetermined values, respectively, and a plurality of variable resistors or the DC load grounding current sensitivity setters 15A-15U for setting current sensitivities of output voltages from the variable resistors 502A-502U, respectively.

Also, the load fault signal generating circuit 50 includes a plurality of comparison amplifiers 504A-504U, each for comparing an output voltage from a corresponding one of the DC load grounding current sensitivity setters 15A-15U with a reference voltage, and a plurality of delay circuits having condensers 511A-511U, respectively, each delay circuit delaying a corresponding one of output signals from the comparison amplifiers 504A-504U.

The load fault signal generating circuit 50 also includes a plurality of transistors 510A-510U, each being turned on in response to a corresponding one of output signals from the delay circuits, and a plurality of relays RYA-RYU, each for performing a latching operation to operate a corresponding one of the load grounded state detecting lamps L1-L20 when a corresponding one of the transistors 510A-510U is turned on.

As shown in FIG. 5, the grounding current detecting circuit 40 may include a plurality of circuits 400A-400U applied individually every load and each having corresponding ones of the leakage current detecting current transformers 40A-40U and the comparison amplifiers 405A-405U. Also, the load fault signal generating circuit 50 may include a plurality of circuits 500A-500U applied individually every load and each having corresponding ones of the variable resistors 502A-502U, the DC load grounding current sensitivity setters 15A-15U, the comparison amplifiers 504A-504U, the delay circuits, the transistors 510A-510U and the relays RYA-RYU.

Now, the operation of the monitoring apparatus with the above-mentioned construction in accordance with the present invention will be described in detail with reference to FIGS. 1 to 5.

First, in the power supply circuit 20, if the power switch 7 is turned on by the user, the commercial AC voltage of 220 V is applied to the light emitting diode 7A through the power switch 7 and a rectifying diode 70, thereby causing the light emitting diode 7A to be lighted. The commercial AC voltage of 220 V is also applied to a surge protecting circuit consisting of a TNR 201, a resistor 202 and a condenser 203, and to first and second primary coils LP1 and LP2 of the power transformer 204.

Upon application of the commercial AC voltage of 220 V to the first primary coil LP1 of the transformer 204, the AC voltage of about 110 V is generated from the first secondary coil LS1 of the transformer 204 and then applied to the low frequency signal generating circuit 30a. Also, the AC voltage C-C1 of 18 V is generated from the second secondary coil LS2 of the transformer 204 and then applied to the overvoltage detecting circuit 30d.

Also, upon application of the commercial AC voltage of 220 V to the second primary coil LP2 of the transformer 204, the AC voltage A-A1, of 18 V is generated from the third secondary coil LS3 of the transformer 204 and then applied to the main (−) grounded state detecting circuit 30b, and the AC voltage B-B1 of 18 V is generated from the fourth secondary coil LS4 of the transformer 204 and then applied to the main (+) grounded state detecting circuit 30c. Also, an AC voltage of 16 V is generated from a fifth secondary coil LS5 of the transformer 204. The AC voltage from the fifth secondary coil LS5 of the transformer 204 is rectified by a bridge circuit 205, smoothed by smoothing condensers 206 and 207 and then applied to constant voltage ICs 208 and 209, which generate DC voltages of ±12 V to the circuits in FIG. 5, respectively.

The AC voltage from the first secondary coil LS1 of the transformer 204 is half wave-rectified by the half wave-rectifying diodes D1 and D2 in the low frequency signal generating circuit 30a and then transmitted over the DC circuit lines P and N. The AC signal transmitted from the diodes D1 and D2 is a pulse signal of low frequency having the range (for example, 110-130 Hz) of having no effect on different components.

In detail, in the case where the (−) DC circuit line N is grounded, a voltage of the (−) DC voltmeter 2 is decreased, whereas a voltage of the (+) DC voltmeter 1 is increased. Also, the level of a voltage on the (+) DC circuit line P is increased. In this case, in the main (−) grounded state detecting circuit 30b, the voltage on the (+) DC circuit line P is applied through the variable resistor 311, a resistor 312, the main (−) grounding current setting resistor 9 and a resistor 313 to a non-inverting input terminal (+) of the comparison amplifier 314, an inverting input terminal (−) of which is applied with the reference voltage which is set by resistors 315 and 316 and a zener diode 317.

When the voltage of the (+) DC voltmeter 1 is higher than that of the (−) DC voltmeter 2, the comparator 314 outputs a high signal to a diode 320, the condenser 321 and the switch 322 through resistors 318 and 319. The switch 322 and the condenser 321 constitute the delay circuit for delaying the operation of the transistor 323 by 1 sec when the output of the comparison amplifier 314 is high.

On the other hand, the AC voltage A-A1 from the third secondary coil LS3 of the transformer 204 is converted into the DC voltage of about 12 V by the diode 324, the condenser 325 and the constant voltage IC 326 and then applied to a relay coil X1 of the relay RY1 and the main (−) grounded state indicating lamp or light emitting diode 4. If the transistor 323 is turned on, a current flows through the relay coil X1, a relay contact RS1 is turned on and the light emitting diode 4 is lighted, thereby causing the user to readily recognize that the (−) DC circuit line N is grounded.

The switch 322 and the condenser 321 function to prevent the main (−) grounded state indicating lamp 4 from being operated due to the instantaneous grounding of the loads. In other words, when the output of the comparison amplifier 314 is high, the transistor 323 can be turned on after the charging of the condenser 321 is ended. As a result, the transistor 323 and, thus, the main (−) grounded state indicating lamp 4 are prevented from being operated due to the instantaneous grounding of the loads. Thereafter, in the case where the (−) DC circuit line N is restored from the grounded state to the original state, the output of the comparison amplifier 314 goes low, thereby causing the transistor 323 to be turned off. However, even in this case, the relay contact RS1 remains at its ON state until the reset switch 14 is pushed by the user, so that the main (−) grounded state indicating lamp 4 is continuously maintained lighted. When the reset switch 14 is pushed by the user, the AC voltage A-A1 from the third secondary coil LS3 of the transformer 204 is instantaneously interrupted and again supplied to the main (−) grounded state detecting circuit 30b. As a result, the relay coil X1 is returned to the initial state or OFF state, thereby causing the relay contact RS1 to be turned off.

The main (−) grounded state indicating lamp 4 is turned off as the relay contact RS1 and the transistor 323 are turned off. Therefore, the monitoring apparatus is restored to the normal state.

In the case where the (+) DC circuit line P is grounded, a voltage of the (+) DC voltmeter i is decreased, whereas a voltage of the (−) DC voltmeter 2 is increased. Also, the level of a voltage on the (−) DC circuit line N is increased. In this case, in the main (+) grounded state detecting circuit 30c, the voltage on the (−) DC circuit line N is applied through the variable resistor 331, a resistor 332, the main (+) grounding current setting resistor 8 and a resistor 333 to a non-inverting input terminal (+) of the comparison amplifier 334, an inverting input terminal (−) of which is applied with the reference voltage which is set by resistors 335 and 336 and a zener diode 337.

When the voltage of the (−) DC voltmeter 2 is higher than that of the (+) DC voltmeter 1, the comparator 334 outputs a high signal to a diode 340, the condenser 341 and the switch 342 through resistors 338 and 339. The switch 342 and the condenser 341 constitute the delay circuit for delaying the operation of the transistor 343 by 1 sec when the output of the comparison amplifier 334 is high.

By the way, the AC voltage B-B1 from the fourth secondary coil LS4 of the transformer 204 is converted into the DC voltage of about 12V by the diode 344, the condenser 345 and the constant voltage IC 346 and then applied to a relay coil X2 of the relay RY2 and the main (+) grounded state indicating lamp or light emitting diode 3. If the transistor 343 is turned on, a current flows through the relay coil X2, a relay contact RS2 is turned on and the light emitting diode 3 is lighted, thereby causing the user to readily recognize that the (+) DC circuit line P is grounded. The switch 342 and the condenser 341 function to prevent the main (+) grounded state indicating lamp 3 from being operated due to the instantaneous grounding of the loads. Namely, when the output of the comparison amplifier 334 is high, the transistor 343 can be turned on after the charging of the condenser 341 is ended. As a result, the transistor 343 and, thus, the main (+) grounded state indicating lamp 3 are prevented from being operated due to the instantaneous grounding of the loads.

Then, in the case where the (+) DC circuit line P is restored from the grounded state to the original state, the output of the comparison amplifier 334 goes low, thereby causing the transistor 343 to be turned off. However, even in this case, the relay contact RS2 remains at its ON state until the reset button 14 is pushed by the user, so that the main (+) grounded state indicating lamp 3 is continuously maintained lighted. When the reset button 14 is pushed by the user, the AC voltage B-B1 from the fourth secondary coil LS4 of the transformer 204 is instantaneously interrupted and again supplied to the main (+) grounded state detecting circuit 30c. As a result, the relay coil X2 is returned to the initial state or OFF state, thereby causing the relay contact RS2 to be turned off.

The main (+) grounded state indicating lamp 3 is turned off as the relay contact RS2 and the transistor 343 are turned off. Therefore, the monitoring apparatus is restored to the normal state.

The grounded state test buttons 5 and 6 are used to test the operating states of the main (+) and (−) grounded state indicating lamps 3 and 4. For example, the grounded state test button 5 is pushed by the user to test the operating state of the main (+) grounded state indicating lamp 3.

When the grounded state test button 5 is pushed by the user, a voltage of the (+) DC voltmeter 1 is decreased, whereas a voltage of the (−) DC voltmeter 2 is increased. In this case, as mentioned above, the output of the comparison amplifier 334 becomes high and the transistor 343 is thus turned on. The turning-on of the transistor 343 causes the relay coil X2 and, thus, the relay contact RS2 to be turned on. As a result, the main (+) grounded state indicating lamp or light emitting diode 3 is lighted. At this time, an unlighted state of the light emitting diode 3 means that the diode 3 is broken down. In this case, the user must replace the light emitting diode 3 with a new one. Thereafter, when the reset button 14 is pushed by the user for completion of the lamp test, the operation of the main (+) grounded state indicating lamp 3 is stopped.

Also, the grounded state test button 6 is pushed by the user to test the operating state of the main (−) grounded state indicating lamp 4. In this case, the output of the comparison amplifier 314 becomes high and the transistor 323 is thus turned on. The turning-on of the transistor 323 causes the relay coil X1 and, thus, the relay contact RS1 to be turned on. As a result, the operating state of the main (−) grounded state indicating lamp 4 is tested in the same manner as that in the main (+) grounded state indicating lamp 3.

On the other hand, in the case where an overvoltage is generated on the DC circuit lines, a voltage at a Q point in FIG. 3a is increased. In the overvoltage detecting circuit 30d, the increased voltage at the Q point is applied through a resistor 351, the overvoltage trip setting resistor 10 and a resistor 352 to a non-inverting input terminal (+) of the comparison amplifier 353, an inverting input terminal (−) of which is applied with the reference voltage which is set by resistors 354 and 355 and a zener diode 356.

It is preferable to set the reference voltage about 10% higher than the DC input voltage. When the DC input voltage is higher than the reference voltage, the comparison amplifier 353 outputs a high signal to the transistor 359 through resistors 357 and 358, thereby causing the transistor 359 to be turned on.

Also, the AC voltage C-C1 from the second secondary coil LS2 of the transformer 204 is converted into the DC voltage of about 12 V by the diode 360, the condenser 361 and the constant voltage IC 362 and then applied to a relay coil X3 of the relay RY3 and the overvoltage indicating lamp or light emitting diode 11. If the transistor 359 is turned on, a current flows through the relay coil X3, a relay contact RS3 is turned on and the light emitting diode 11 is lighted, thereby causing the user to readily recognize the generation of the overvoltage. Also, a buzzer 363 acts to inform the user of the generation of the overvoltage.

While the relay coil X3 is turned on, the relay contact RS3 remains at its ON state and the light emitting diode 11 is thus continuously maintained lighted, whereas an overvoltage control contact X-RS3 in the power supply circuit 20 is turned off. The turning-off of the overvoltage control contact X-RS3 causes no current to flow through the second primary coil LP2 of the power transformer 204. As a result, no voltage is generated from the secondary coils LS3, LS4 and LS5 of the power transformer 204, so that the main (−) and (+) grounded state detecting circuits 30b and 30c and the circuits in FIG. 5 cannot be operated. On the other hand, since the first primary coil LP1 of the power transformer 204 is active, the voltages are continuously generated from the secondary coils LS1 and LS2 of the power transformer 204. The continuous generation of the voltage from the secondary coil LS1 allows the low frequency AC pulse signal from the low frequency signal generating circuit 30a to be continuously applied to the DC circuit lines P and N. Also, the continuous generation of the voltage C-C1 from the secondary coil LS2 allows the overvoltage detecting circuit 30d to be continuously operated.

The overvoltage indicating lamp 11 is not turned off even when the DC input voltage is restored to the normal state. In other words, the overvoltage detecting circuit 30d is not restored to the original state even when the reset button 14 is pushed by the user. In order to restore the overvoltage detecting circuit 30d to the original state, the user must turn off and again on the power switch 7. If the power switch 7 is turned off and again on, the relay contact RS3 is turned off, resulting in the turning-off of the overvoltage indicating lamp 11. As a result, the overvoltage control contact X-RS3 is turned on or closed. Therefore, the monitoring apparatus can be restored to the normal state.

The digital watch control circuit 60 in FIG. 2 stops the digital watch 13 at the moment that the relay coils X1 and X2 in FIGS. 3a and 3b are operated, so that the digital watch 13 can indicate the time that the grounded states are generated. Then, when the reset button 14 is pushed by the user, the digital watch control circuit 60 controls the digital watch 13 to indicate the current time, at the same time that the operations of the main (−) and (+) grounded state detecting circuits 30b and 30c are stopped.

As mentioned above with reference to FIG. 5, the grounding current detecting circuit 40 includes the plurality of circuits 400A–400U applied individually every load and each having the corresponding ones of the leakage current detecting current transformers 40A–40U and the comparison amplifiers 405A–405U. Also, the load fault signal generating circuit 50 includes the plurality of circuits 500A–500U applied individually every load and each having the corresponding ones of the variable resistors 502A–502U, the DC load grounding current sensitivity setters 15A–15U, the comparison amplifiers 504A–504U, the delay circuits, the transistors 510A–510U and the relays RYA–RYU. Since the circuits 400A–400U of the grounding current detecting circuit 40 have the same construction and the circuits 500A–500U of the load fault signal generating circuit 50 have the same construction, like reference numerals designate like parts.

For example, when the low frequency pulse signal on the DC circuit line P and N is detected by one 40A of the leakage current detecting current transformers 40A–40U, the detected pulse signal is applied through a coupling condenser 401A, resistors 402A and 403A and a condenser 404A to a non-inverting input terminal (+) of the comparison amplifier 405A. Upon application of the detected low frequency pulse signal, the comparison amplifier 405A outputs a high signal to the load fault signal generating circuit 500A through a resistor 406A, a diode 407A and a condenser 408A. In the load fault signal generating circuit 500A, the high signal or the grounding current signal from the comparison amplifier 405A in the grounding current detecting circuit 400A is applied through a resistor 501A and the variable resistor 502A to the variable resistor 15A, which set the current sensitivity of the received signal. Then, the output voltage from the variable resistor 15A is applied through a resistor 503A to a non-inverting input terminal (+) of the comparison amplifier 504A, an inverting input terminal (−) of which is applied with the reference voltage which is set by resistors 505A and 506A and a zener diode 507A.

When the output voltage from the variable resistor 15A is higher than the reference voltage, the comparison amplifier 504A outputs a high signal to a base of the transistor 510A through resistors 508A and 509A. The condenser 511A connected to the base of the transistor 510A acts to delay the output of the comparison amplifier 504A by a predetermined time period (about 0.5 sec), so as to prevent the transistor 510A from being turned on due to the instantaneous grounding.

If the output of the comparison amplifier 504A is maintained high for a long time exceeding the predetermined time period, the transistor 510A is turned on, thereby causing a relay coil XA of the relay RYA and, thus, a relay contact RXA thereof to be turned on. As the transistor 510A and the relay contact RXA are turned on, the DC voltage of +12 V is bypassed to the ground through the reset button 14, the load grounded state detecting lamp or light emitting diode L1, a resistor 512A, a diode 513A, the relay contact RXA and a collector and an emitter of the transistor 510A, thereby causing the load grounded state detecting lamp L1 to be lighted.

For example, provided that the grounding current of 5 mA flows through the (+) DC line of the first load under the condition that the current sensitivity is set to 5mA by the first DC load grounding current sensitivity setting variable resistor 15A and the current sensitivity is set to 10 mA by the main (+) grounding current setting resistor 8, the load grounded state detecting lamp L1 is lighted, while the main (+) grounded state indicating lamp 3 is not lighted. The reason is because the current sensitivity is set to 10 mA by the main (+) grounding current setting resistor 8. In this case, the lighting of the main (+) grounded state indicating lamp 3 is performed by slowly turning the main (+) grounding current setting resistor 8 counter clockwise. The lighting of the main (+) grounded state indicating lamp 3 at that time allows the user to recognize that the grounding current of the load is about 5 mA.

Then, when the load is restored from the grounded state to the normal state, the output of the comparison amplifier 405 goes low and the output of the comparison amplifier 504A thus goes low, thereby causing the transistor 510A to be turned off. Even upon turning-off of the transistor 510A, the relay contact RXA remains at its ON state and the light emitting diode L1 is thus continuously maintained lighted. In this case, the unlighted state of the light emitting diode L1 is performed when the reset button 14 is pushed by the user. Namely, if the reset button 14 is pushed by the user, the DC voltages of ±12 V are interrupted and again applied to the load fault signal generating circuit 500A. As a result, the relay coil XA and the relay contact RXA are turned off so that the light emitting diode L1 can be unlighted. At the same time, the main (+) grounded state indicating lamp 3 is also turned off. Therefore, the monitoring apparatus is returned to the initial state, so as to continuously monitor the grounded states of the DC loads.

By the way, in the case where the lamp test button 16 is pushed by the user, the DC voltage of +12 V is bypassed to the ground through the reset button 14, the light emitting diode L1, the resistor 512A, the diode 513A and the lamp test button 16, so that the light emitting diode L1 can be lighted regardless of the relay coil XA and the relay contact RXA. Hence, the user can test presence of an abnormal state of the load grounded state detecting lamp L1 using the lamp test button 16.

The remaining circuits in FIG. 5 are operated in the same manner as those of the grounding current detecting circuit 400A and the load fault signal generating circuit 500A and a description thereof will thus be omitted.

As apparent from the above description, the present invention can provide the following advantages.

First, the low frequency AC signal of the range of having no effect on different components is applied to the DC circuit lines to which the multiple DC loads are connected, and the grounded state or faulty state of the whole or each of the DC loads can readily be monitored through each lamp by detecting the low frequency AC signal components leaked from the multiple DC loads due to the grounding.

Second, the sensitivity of the grounding current can be set according to the polarities P and N.

Third, the overvoltage detecting circuit is provided in the monitoring apparatus to interrupt the AC power supply to the apparatus when the DC input voltage exceeds about 10% over a rating, so as to protect the apparatus from the overvoltage. Also, the surge protecting circuit is provided in the monitoring apparatus to cope sufficiently with an external surge voltage.

Fourth, the digital watch is automatically stopped when the grounded state is detected from the load. Thereafter, upon release of the faulty state, the digital watch indicates the current time again. Therefore, the user can readily recognize the time that the faulty state of each load is generated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, although 20 loads have been shown in FIG. 1, the number of the loads may be either reduced to 10 or increased to 30. This is enabled by increasing the number of the circuits in FIG. 5.

What is claimed is:

1. An apparatus for monitoring grounded states of multiple DC loads of a relay system, comprising:
   power supply means for inputting a commercial AC power and supplying DC voltages necessary to the DC loads and (+) and (−) DC circuit lines to which the DC loads connected;
   low frequency signal generating means for receiving a desired AC voltage from said power supply means and transmitting a low frequency AC signal over said (+) and (−) DC circuit lines, the low frequency AC signal having the range of having no effect on different components;
   main (−) grounded state detecting means for receiving a desired AC voltage from said power supply means and detecting a (−) grounded state of the whole of the (+) and (−) DC circuit lines and the DC loads;
   main (+) grounded state detecting means for receiving a desired AC voltage from said power supply means and detecting a (+) grounded state of the whole of the (+) and (−) DC circuit lines and the DC loads;
   overvoltage detecting means for receiving a desired AC voltage from said power supply means and detecting an overvoltage at an input stage of the apparatus to protect the apparatus from the overvoltage;

grounding current detecting means for detecting individually the low frequency AC signals transmitted by said low frequency signal generating means from the DC loads when the DC loads are grounded and converting the detected low frequency AC signals into digital grounding current signals; and load fault signal generating means for generating load fault signals in response to the grounding current signals from said grounding current detecting means so as to indicate individually the grounded states of the DC loads.

2. An apparatus for monitoring grounded states of multiple DC loads of a relay system, as set forth in claim 1, wherein said low frequency signal generating means includes:

a pair of diodes for cooperating to convert the AC voltage from said power supply means into the low frequency AC signal and apply the low frequency AC signal to the (+) and (−) DC circuit lines and the DC loads.

3. An apparatus for monitoring grounded states of multiple DC loads of a relay system, as set forth in claim 1, wherein said low frequency signal generating means includes:

a transformer for converting the AC voltage from said power supply means into the low frequency AC signal and applying the low frequency AC signal to the (+) and (−) DC circuit lines and the DC loads.

4. An apparatus for monitoring grounded states of multiple DC loads of a relay system, as set forth in claim 1, wherein the low frequency AC signal has a frequency of 110–130 Hz.

5. An apparatus for monitoring grounded states of multiple DC loads of a relay system, as set forth in claim 2, wherein the low frequency AC signal has a frequency of 110–130 Hz.

6. An apparatus for monitoring grounded states of multiple DC loads of a relay system, as set forth in claim 1, wherein said main (−) grounded state detecting means includes:

a diode, a condenser and a constant voltage IC for cooperating to convert the AC voltage from said power supply means into a DC voltage;

a variable resistor for setting a current sensitivity according to an increased voltage on the (+) DC circuit line;

a comparison amplifier for comparing an output voltage from said variable resistor with a reference voltage;

a delay circuit having a condenser and a switch, said delay circuit delaying an output signal from said comparison amplifier;

a transistor being turned on in response to an output signal from said delay circuit; and a relay for performing a latching operation for the DC voltage from said constant voltage IC to operate a main (−) grounded state indicating lamp when said transistor is turned on.

7. An apparatus for monitoring grounded states of multiple DC loads of a relay system, as set forth in claim 1, wherein said main (+) grounded state detecting means includes:

a diode, a condenser and a constant voltage IC for cooperating to convert the AC voltage from said power supply means into a DC voltage;

a variable resistor for setting a current sensitivity according to an increased voltage on the (−) DC circuit line;

a comparison amplifier for comparing an output voltage from said variable resistor with a reference voltage;

a delay circuit having a condenser and a switch, said delay circuit delaying an output signal from said comparison amplifier;

a transistor being turned on in response to an output signal from said delay circuit; and a relay for performing a latching operation for the DC voltage from said constant voltage IC to operate a main (+) grounded state indicating lamp when said transistor is turned on.

8. An apparatus for monitoring grounded states of multiple DC loads of a relay system, as set forth in claim 1, wherein said overvoltage detecting means includes:

a diode, a condenser and a constant voltage IC for cooperating to convert the AC voltage from said power supply means into a DC voltage;

a variable resistor for setting an overvoltage according to voltages increased on the (+) and (−) DC circuit lines;

a comparison amplifier for comparing an output voltage from said variable resistor with a reference voltage;

a transistor being turned on in response to an output signal from said comparison amplifier; and a relay for performing a latching operation for the DC voltage from said constant voltage IC to operate an overvoltage indicating lamp when said transistor is turned on.

9. An apparatus for monitoring grounded states of multiple DC loads of a relay system, as set forth in claim 1, wherein said grounding current detecting means includes:

a plurality of leakage current detecting current transformers connected respectively to the DC loads for detecting individually the low frequency AC signals transmitted by said low frequency signal generating means from the DC loads; and a plurality of comparison amplifiers for converting the detected low frequency AC signals from the leakage current detecting current transformers into the digital grounding current signals, respectively.

10. An apparatus for monitoring grounded states of multiple DC loads of a relay system, as set forth in claim 1, wherein said load fault signal generating means includes:

a plurality of DC load grounding current sensitivity setters for setting current sensitivities of the grounding current signals from said grounding current detecting means, respectively;

a plurality of comparison amplifiers, each for comparing an output voltage from a corresponding one of said DC load grounding current sensitivity setters with a reference voltage;

a plurality of delay circuits having condensers, respectively, each of said delay circuits delaying a corresponding one of output signals from said comparison amplifiers;

a plurality of transistors, each being turned on in response to a corresponding one of output signals from said delay circuits; and a plurality of relays, each for performing a latching operation to operate a corresponding one of a plurality of load grounded state detecting lamps when a corresponding one of said transistors is turned on.

11. An apparatus for monitoring grounded states of multiple DC loads of a relay system, as set forth in claim 1, wherein said power supply means includes:

a power transformer having a plurality of primary coils for inputting the commercial AC power and a plurality of secondary coils for supplying the AC voltages to said low frequency signal generating means, said main (−) grounded state detecting means, said main (+) grounded state detecting means and said overvoltage detecting means, respectively.

* * * * *